United States Patent [19]

Cooprider et al.

[11] Patent Number: 5,714,237
[45] Date of Patent: Feb. 3, 1998

[54] PARTIALLY CROSSLINKED MICROSPHERES

[75] Inventors: Terrence E. Cooprider, Woodbury; Michael D. Crandall, North Oaks; James E. Garbe, Inver Grove Heights; Richard J. Goetz, Woodbury; Michael R. Kesti, Minneapolis, all of Minn.

[73] Assignee: Minnesota Mining Manufacturing Company, St. Paul, Minn.

[21] Appl. No.: 585,795

[22] Filed: Jan. 16, 1996

[51] Int. Cl.$^6$ .................................................. B32B 3/00
[52] U.S. Cl. .......................... 428/206; 523/221; 524/460
[58] Field of Search ........................... 428/206; 524/460; 523/221

[56] References Cited

U.S. PATENT DOCUMENTS

| | | | |
|---|---|---|---|
| 3,691,140 | 9/1972 | Silver | 260/78.5 |
| 4,166,152 | 8/1979 | Baker et al. | 428/522 |
| 4,276,212 | 6/1981 | Khanna et al. | 260/39 R |
| 4,645,783 | 2/1987 | Knoshita | 523/221 |
| 4,656,218 | 4/1987 | Kinoshita | 524/460 |
| 4,833,179 | 5/1989 | Young . | |
| 4,988,567 | 1/1991 | Delgado | 428/402 |
| 5,053,436 | 10/1991 | Delgado | 521/64 |
| 5,326,842 | 7/1994 | Knudsen et al. | 526/317.1 |
| 5,571,617 | 11/1996 | Cooprider et al. | 428/341 |

FOREIGN PATENT DOCUMENTS 0 661302 A  7/1995  European Pat. Off. .

*Primary Examiner*—Melvyn I. Marquis
*Attorney, Agent, or Firm*—Carolyn V. Peters

[57] ABSTRACT

An adhesive composition is provided comprising:

(a) a plurality of polymeric, elastomeric microspheres wherein the microspheres are the reaction product of reactants comprising polymerizable starting materials comprising at least one $C_4$–$C_{14}$ alkyl (meth)acrylate monomer and optionally at least one comonomer and have a solvent soluble portion that is 30–98% of the microsphere.

15 Claims, No Drawings

PARTIALLY CROSSLINKED MICROSPHERES

TECHNICAL FIELD

This invention relates to a microsphere adhesive and in particular to a microsphere adhesive that exhibits enhanced adhesion to substrates while remaining repositionable.

BACKGROUND OF THE INVENTION

Repositionable adhesives are commonly used for temporary messaging or signage in the home and office environment. This type of product is typified by Post-it® brand notes. When using such a product it is desired that the note adhere to a variety of surfaces yet be cleanly removable from the surface without leaving adhesive residue, while maintaining the repositionable characteristics of the notes.

References can be cited for the preparation and/or use of inherently tacky, polymeric microsphere adhesives (see for example, U.S. Pat. Nos. 3,691,140 and 4,166,152). Such microsphere adhesives are typically used for the commonly recognized repositionable notes.

Various investigators have sought to improve or further enhance adhesion to surfaces other than the commonly used paper surfaces. Various techniques have been used, such as chemical modification of the microsphere, alteration of the adhesive composition, including the use of binders and the like, or process modifications. For example, U.S. Pat. No. 5,053,436 describes a hollow microsphere, wherein the microsphere provides increased resistance to adhesive transfer and an increased adhesion level. Along the same line, U.S. Pat. No. 4,988,567 describes microspheres having multiple small voids.

In yet another attempt, U.S. Pat. No. 5,326,842 describes a dual polymerization process wherein high tack adhesives are produced wherein a chain transfer agent is used in the first step (suspension polymerization) and the second step (emulsion polymerization) provides stability of the final material.

However, to date, control of the solvent soluble portion of the microsphere to produce a stable repositionable microsphere adhesive with enhanced adhesion has not been contemplated.

SUMMARY OF THE INVENTION

Briefly, in one aspect of the present invention, a microsphere adhesive composition is provided comprising a 30–98% solvent soluble portion.

In particular, the present invention comprises a microsphere adhesive composition comprising:

(a) a plurality of polymeric, elastomeric microspheres wherein the microspheres are the reaction product of reactants comprising polymerizable starting materials comprising at least one $C_4$–$C_{14}$ alkyl (meth)acrylate monomer and optionally at least one comonomer;

(b) optionally, a polymeric stabilizer in an amount of between about 0.1 and about 3 parts by weight per 100 parts by weight of the microspheres, preferably about 0.1 to about 1.5 parts by weight per 100 parts by weight of the microspheres;

(c) a surfactant in an amount of no greater than about 5 parts by weight per 100 parts by weight of the microspheres, preferably no greater than 3 parts by weight and most preferably in the range of 0.5 to about 1.5 parts by weight per 100 parts by weight of the microspheres;

(d) a modifier, wherein the modifier can be at least one of a chain transfer agent, a tackifier, a solvent or the like in an amount that is sufficient to provide microspheres with a solvent soluble portion in the range of 30–98%, preferably in the range of 40–95%; and (e) an initiator present in amounts ranging from 0.1 to approximately 2 parts by weight per 100 parts by weight of the polymerizable monomer starting material.

As used in this application, the notation "(meth)acrylate" refers to acrylate and methacrylate.

A modifier may be used to regulate the solvent soluble portion of the microspheres and it is added to the polymerization mixture in an amount sufficient to provide a solvent soluble portion that is in the range of 30–98%, preferably in the range of 40–95%. Various modifiers may be used within the scope of this invention and the amounts used are those that sufficiently provide the microspheres with a solvent soluble portion. Such amounts would range, for example for solvents from 1–30%, for tackifiers from 1–30% and for chain transfer agents, up to about 0.15%.

Particularly useful modifiers are chain transfer agents. To control the molecular weight of the polymer being formed in the microsphere a chain transfer agent or modifier is used. Many halogen-and sulfur-containing organic compounds function well as chain transfer agents in free radical polymerizations. Non-limiting examples of such agents are: carbon tetrabromide, carbon tetrachloride, dodecanethiol, iso-octylthioglycolate, butyl mercaptan, and tertiary-dodecyl mercaptan. Particularly useful chain transfer agents are long chain mercaptans, such as dodecanethiol. The amount of chain transfer agent suitable for microsphere polymerizations is calculated on a weight basis to the entire polymerizable content. The chain transfer agent is preferably added at up to about 0.15%, more preferably up to about 0.12% and most preferably up to about 0.08%. These levels are adequate to provide a solvent soluble polymer component in the microsphere of up to about 98%.

Other useful modifiers are solvents. Examples of which are but not limited to: aliphatic or aromatic solvents such as heptane, benzene, toluene and the like; alcohols such as methanol, isopropyl alcohol, and the like; and ketones such as acetone, methyl ethyl ketone and the like. The amount of solvent suitable for microsphere polymerizations is calculated on a weight basis to the entire polymerizable content. The solvent is preferably added at up to about 30%, more preferably up to about 15% and most preferably up to about 5%. These levels are adequate to provide a solvent soluble polymer component in the microspheres of up to about 98%.

Still other useful modifiers include tackifiers and/or plasticizers. Examples of which are but not limited to: hydrogenated rosin esters commercially available from such companies as Hercules, Inc. under the tradenames of Foral™, Regalfez® and Pentalyn™. Tackifying resins also include those based on t-butyl styrene. Useful plasticizers include but are not limited to dioctylphthalate, 2 ethylhexyl phosphate, tricresyl phosphate, mineral oil and the like. The tackifier and/or plasticizer are preferably added at up to about 30%, more preferably up to about 15% and most preferably up to about 5%. These levels provide a solvent soluble polymer component in the microsphere of up to about 98%.

In another aspect of the present invention acne step suspension polymerization process is provided for preparing polymeric elastomeric microspheres comprising the steps of:

(a) stirring or agitating a mixture comprising polymerizable monomer starting materials comprising:
  (i) at least one $C_4$–$C_{14}$ alkyl (meth)acrylate monomer and, optionally at least one comonomer;
  (ii) an initiator for the polymerizable monomer starting materials present in amounts ranging from 0.1 to approximately 2 parts per weight per 100 parts by weight of the polymerizable monomer starting materials;
  (iii) optionally, a polymeric stabilizer in an amount in the range of 0.1 to about 3 parts by weight per 100 parts by weight of the polymerizable monomer starting materials;
  (iv) a surfactant in an amount no greater than about 5 parts by weight per 100 parts by weight of polymerizable monomer, preferably no greater than about 3 parts by weight and most preferably in the range of 0.5 to 1.5 parts by weight;
  (v) water to form an oil in water suspension; and
  (vi) a modifier in an amount sufficient to provide a solvent soluble portion in the range of 30–98%; and
(b) polymerizing the (meth)acrylate monomer(s) and the comonomer(s), if present; wherein microspheres are provided.

In yet another aspect, the present invention provides a two-step suspension polymerization process for preparing polymeric elastomeric microspheres from polymerizable monomer stating materials, wherein the process comprising the steps of:
(a) stirring or agitating a mixture comprising:
  (i) at least one $C_4$–$C_{14}$ alkyl (meth)acrylate monomer;
  (ii) an initiator for the monomer present in amounts ranging from 0.1 to approximately 2 parts per weight per 100 parts by weight of the polymerizable monomer starting materials;
  (iii) optionally, a polymeric stabilizer in an amount in the range of 0.1 to about 3 parts by weight per 100 parts by weight of the polymerizable monomer starting materials;
  (iv) a surfactant in an amount of no greater than about 5 parts by weight per 100 parts by weight of the polymerizable monomer starting materials, preferably no greater than 3 parts by weight and most preferably in the range of 0.5 to 2 parts by weight;
  (v) a modifier in an amount sufficient to provide a solvent soluble portion in the range of 30–98%; and
  (vi) water to form an oil in water suspension;
(b) at least partially polymerizing the polymerizable monomer starting materials;
(c) adding to the suspension at least one comonomer; and
(d) continuing the polymerization of the polymerizable monomer starting materials; wherein microspheres are provided.

The present invention also provides in another aspect a sheet material comprising a backing and a coating of repositionable pressure sensitive adhesive described above is coated on at least one portion of at least one major surface.

Advantageously, the present invention provides a microsphere-based pressure sensitive adhesive having a high solvent soluble fraction that adheres to rough surfaces such as fabric, removes cleanly, and exhibits the ability to be reapplied multiple times if desired. Even with this enhanced adhesion to rough surfaces the microsphere adhesive will still adhere non-destructively to fragile surfaces such as paper. Furthermore, the microsphere adhesive of this invention is prepared according to resource efficient methods.

Several features of the adhesive of the present invention provide a number of desirable advantages that have heretofore been unavailable. For example several advantages include, (a) improved adhesion to various surfaces (textured surfaces, fabric, wood, painted surfaces, glass, vinyl, etc), (b) high adhesion without fiber pick or substrate damage on removal from substrates, (c) adhesive strength that remains constant or slightly builds after a period of time, and (d) a microsphere adhesive that adheres to a substrate or backing and easily removes from applied surfaces without transferring or leaving an adhesive residue on the applied surface.

DESCRIPTION OF THE PREFERRED EMBODIMENT

The microspheres obtained in the present invention are the reaction product of (a) at least one alkyl (meth)acrylate ester wherein the alkyl group contains four to about 14 carbon atoms, preferably four to about 10 carbon atoms and, optionally, a comonomer. The comonomer, if present may be nonpolar, ionic polar or mixtures of such monomers.

Useful alkyl (meth)acrylate monomers are those monofunctional unsaturated (meth)acrylate esters, the alkyl groups of which have from 4 to 14 carbons atoms. Such (meth)acrylates are oleophilic, water dispersible, and are essentially water insoluble. Furthermore, useful (meth) acrylates are those that as homopolymers, generally have a glass transition temperature below about −20° C., or if a combination of monomers is used, such a combination would produce a copolymer or terpolymer generally having a glass transition temperature below about −20° C. Nonlimiting examples of such (meth)acrylates included but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, t-butyl acrylate, t-butyl methacrylate, isobornyl acrylate, methylmethacrylate, isononyl acrylate, isodecyl acrylate and the like, and the combination thereof.

Preferred alkyl (meth)acrylate monomers include isooctyl acrylate, isononyl acrylate, isoamyl acrylate, isodecyl acrylate, 2-ethylhexyl acrylate, n-butyl acrylate, sec-butyl acrylate and mixtures thereof.

Vinyl ester monomers suitable for use in the present invention include but are not limited to: vinyl 2-ethylhexanoate, vinyl caprate, vinyl laurate, vinyl pelargonate, vinyl hexanoate, vinyl propionate, vinyl decanoate, vinyl actanoate, and other monofunctional unsaturated vinyl esters of linear or branched carboxylic acids comprising 1 to 14 carbon atoms, which as homopolymers have glass transition temperatures below about −10° C. Preferred vinyl ester monomers include vinyl laurate, vinyl caprate, vinyl 2-ethylhexanoate, and mixtures thereof.

Additional other vinyl monomers which, as homopolymers, have glass transition temperatures higher than about −10° C. to 0° C., such as vinyl acetate, acrylonitrile, mixtures thereof and the like, may optionally be utilized in conjunction with one or more of the acrylate, methacrylate and vinyl ester monomers provided the glass transition temperature of the resultant polymer is below about −10° C.

Suitable comonomers include nonpolar, ionic, polar monomers and mixtures thereof. In addition to using one or more acrylate monomers as a comonomer, as described above, the following are non-limiting examples of comonomers:

(A) ionic comonomers, such as sodium methacrylate, ammonium acrylate, sodium acrylate, (I) trimethylamine p-vinyl benzimide, (II) 4,4,9-trimethyl-4-azonia-7-oxo-8-oxa-dec-9-ene-1-sulphonate, (III) N,N-dimethyl-N-(β-methacryloxyethyl) ammonium propionate betaine, (IV) trimethylamine methacrylimide, (V) 1,1-dimethyl-1(2,3-dihydroxypropyl)amine methacrylimide; any zwitterionic monomer and the like;

(B) non-polar comonomers include but are not limited to, 4-methyl-2-pentyl acrylate, 2-methylbutyl acrylate, isoamyl acrylate, sec-butyl acrylate, n-butyl acrylate, isodecyl methacrylate, t-butyl acrylate, t-butyl methacrylate, isobornyl acrylate, octyl acrylamide, methylmethacrylate, isononyl acrylate, isodecyl acrylate, styrene and the like, and the combination thereof.

(C) Polar comonomers may or may not contain a dissociable hydrogen. Examples of suitable polar comonomers include organic carboxylic acids comprising 3 to about 12 carbon atoms and having generally 1 to about 4 carboxylic acid moieties. Nonlimiting examples of such monomers acrylic acid, methacrylic acid, itaconic acid, fumaric acid, crotonic acid, maleic acid, β-carboxyethylacrylate and the like. In addition suitable polar comonomers include acrylamide, methacrylamide, 2-hydroxyethyl acrylate, and the like.

In addition, one class of suitable comonomers are amino-functional monomers having a nucleus or portion of the nucleus of the general formula (a):

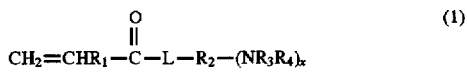

wherein $R_1$ is —H, —$CH_3$, —$CH_2CH_3$, cyano or carboxymethyl;

$R_2$ is a hydrocarbyl radical comprising 1 to about 12 carbon atoms;

$R_3$ and $R_4$ are independently H or an alkyl group containing 1 to about 12 carbon atoms or an arylalkyl group or together form a cyclic or heterocyclic moiety;

L is carbon-carbon bond, O, NH or S; and x is an integer of 1 to 3.

Nonlimiting examples of comonomers according to formula (1) include N, N-dimethyl-aminoethyl(methyl)acrylate, N,N-dimethylaminopropyl-(meth)acrylate, t-butylaminoethyl(methyl)acrylate and N,N-diethylaminoacrylate.

Another class of suitable comonomers are comonomers having a nucleus or portion of the nucleus of the general formula (2):

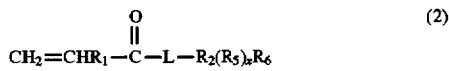

wherein $R_1$ is H, —$CH_3$, —$CH_2CH_3$, cyano or carboxymethyl;

$R_2$ is a hydrocarbyl radical comprising 1 to about 12 carbon atoms;

$R_5$ is —O—, alkylene oxide comprising 1 to 5 carbon atoms, or phenoxy oxide, wherein the alkylene oxide would include, —$CH_2$ O—, —$CH_2CH_2O$—, —$CH_2$(CH)$CH_3O$—, and the like;

$R_6$ is H, —$C_6H_4OH$, or —$CH_3$

L is a carbon-carbon bond, O, NH or S; and x is an integer with the proviso that when $R_5$ is —O—, x is an integer of 1–3.

Nonlimiting examples of comonomers according to formula (2) include hydroxyethyl (meth)acrylate, glycerol mono(meth)acrylate and 4-hydroxybutyl (meth)acrylate, acrylate terminated poly(ethylene oxide); methacrylate terminated poly(ethylene oxide); methoxy poly(ethylene oxide) methacrylate; butoxy poly(ethylene oxide) methacrylate; acrylate terminated poly(ethylene glycol); methacrylate terminated poly(ethylene glycol); methoxy poly(ethylene glycol) methacrylate; butoxy poly(ethylene glycol) methacrylate and mixtures thereof.

Yet another class of suitable comonomers are amido-functional monomers having a nucleus or portion of the nucleus of the general formula (3):

wherein $R_1$ is H, —$CH_3$, —$CH_2CH_3$, cyano or carboxymethyl; and $R_3$ $R_4$ are independently H or an alkyl group containing 1 to about 12 carbons or an arylalkyl group or together form a cyclic or heterocyclic moiety.

Nonlimiting examples of comonomers according to formula (3) include N-vinyl pyrrolidone, N-vinyl caprolactam acrylamide or N, N-dimethyl acrylamide.

Nonlimiting examples of other suitable comonomers that do not fall within the above classes but are within the scope of permissible comonomers include (meth)acrylonitrile, furfuryl (meth)acrylate and tetrahydrofurfuryl (meth)acrylate, 2-vinyl pyridine, and 4-vinyl pyridine.

Typically, when a comonomer is present, the relative amounts by weight of the alkyl (meth)acrylate monomer(s) and the comonomer is in the range of about 99.5/0.5 to 75/25, and preferably is in the range of 98/2 to 92/8.

A modifier may be used to regulate the solvent soluble portion of the microspheres and it is added to the polymerization mixture in an amount sufficient to provide a solvent soluble portion that is in the range of 30–98%, preferably in the range of 40–95%. Various modifiers may be used within the scope of this invention and the amounts used are those that sufficiently provide the microspheres with a solvent soluble portion. Such amounts would range, for example for solvents from 5–30%, for tackifiers and/or plasticizers from 1–30% and for chain transfer agents, up to about 0.15%.

Particularly useful modifiers are chain transfer agents. To control the molecular weight of the polymer being formed in the microsphere it is desirable to use a chain transfer agent or modifier. Many halogen-and sulfur-containing organic compounds function well as chain transfer agents in free radical polymerizations. Non-limiting examples of such agents are: carbon tetrabromide, carbon tetrachloride, dodecanethiol, iso-octylthioglycolate, butyl mercaptan, and tertiary-dodecyl mercaptan. In this invention it is efficacious to employ long chain mercaptans such as dodecanethiol. The amount of chain transfer agent suitable for these microsphere polymerizations is calculated on a weight basis to the entire polymerizable content. The chain transfer agent is preferably added at up to about 0.15% more preferably up to about 0.12% and most preferably up to about 0.08%. These levels are adequate to provide a soluble polymer content in the microsphere of up to about 98%.

The microsphere adhesive composition may also contain a crosslinking agent. Examples of useful crosslinking agents include, but are not limited to: multifunctional (meth)acrylate(s), e.g., butanediol diacrylate or hexanediol diacrylate or other multifunctional crosslinkers such as divinylbenzene and mixtures thereof. When used, crosslinker(s) is (are) added at a level of up to about 0.15 equivalent weight percent, preferably up to about 0.1 equivalent weight percent, of the total polymerizable composition with the proviso that the combination of crosslinking agent and modifier concentrations are chosen to obtain a microsphere with 30 to 98% solvent soluble portion.

The microspheres of the present invention are prepared by suspension polymerization using either a one-step or two-step process as described in detail below. Suspension polymerization is a procedure wherein a monomer is dispersed in a medium (usually aqueous) in which it is insoluble. The polymerization is allowed to proceed within the individual polymer droplets. Monomer soluble free-radical initiators are preferably used. The kinetics and the mechanism are those for the corresponding bulk polymerization under similar conditions of temperature and initiator concentration.

Initiators affecting polymerization are those that are normally suitable for free-radical polymerization of acrylate monomers. Examples of such initiators include thermally-activated initiators such as azo compounds, hydroperoxides, peroxides and the like and photoinitiators such as benzophenone, benzoin ethyl ether and 2,2-dimethoxy-2-phenyl acetophenone. Other suitable initiators include lauroyl peroxide and bis(t-butyl cyclohexyl)peroxy dicarbonate. The initiator is present in a catalytically effective amount sufficient to bring about high monomer conversion in a predetermined time span and temperature range. Typically, the initiator is present in amounts ranging from 0.1 to approximately 2 parts per weight per 100 parts by weight of the polymerizable monomer starting materials.

Parameters that affect the concentration of initiator employed include the type of initiator and particular monomer and/or monomers involved. It is believed that catalytically effective concentrations range from about 0.1 to about 2 percent by weight of the total monomers and more preferably, from about 0.20 to about 0.70 percent by weight monomers and/or monomers.

Optionally, a polymeric stabilizer may be used. Advantageously, the presence of the stabilizer permits the use of relatively low amounts of surfactant while still obtaining microspheres.

Any polymeric stabilizer that effectively provides sufficient stabilization of the final polymerized droplets and prevents agglomeration within a suspension polymerization process is useful in the present invention. When used, a polymeric stabilizer will typically be present in the reaction mixture in an amount by weight of about 0.1 to about 3 parts by weight per 100 parts of polymerizable monomer, and more preferably will be present in an amount by weight of about 0.1 to about 1.5 parts by weight per 100 parts of polymerizable monomer.

Exemplary polymeric stabilizers include salts of polyacrylic acids of greater than 5000 molecular weight average (for example, ammonium, sodium, lithium and potassium salts), carboxy modified polyacrylamides (for example, Cyanamer™ A-370 from American Cyanamid), copolymers of acrylic acid and dimethylaminoethylmethacrylate and the like, polymeric quaternary amines (for example, General Alanine and Film's Gafquat™ 755, a quaternized polyvinylpyrollidone copolymer, or Union Carbide's "JR-400", a quaternized amine substituted cellulosic), cellulosics, and carboxy-modified cellulosics (for example, Hercules' Natrosol™ CMC Type 7L, sodium carboxy methycellulose).

Surfactants will typically be present in the reaction mixture in an amount of no greater than about 5 parts by weight per 100 parts by weight of polymerizable monomer, preferably no greater than about 3 parts by weight, and most preferably in the range of 0.5 to 1.5 parts by weight per 100 parts by weight of polymerizable monomer.

Useful surfactants include anionic, cationic, nonionic or amphoteric surfactants and include but are not limited to anionic surfactants, such as alkyl aryl sulfonates, for example sodium dodecylbenzene sulfonate and sodium decylbenzene, sodium and ammonium salts of alkyl sulfates, for examples sodium lauryl sulfate, and ammonium lauryl sulfate; nonionic surfactants, such as ethoxylated oleoyl alcohol and polyoxyethylene octylphenyl ether; and cationic surfactants, such as a mixture of alkyl dimethylbenzyl ammonium chlorides wherein the alkyl chain contains from 10 to 18 carbon atoms. Amphoteric surfactants are also useful in the present invention and include for example sulfobetaines, N-alkylaminopropionic acids, and N-alkybetaines.

To initiate the polymerization reaction, a sufficient number of free radicals must be present. This may be achieved through several means that are well known in the art, such as heat or radiation free-radical initiation. For example, heat or radiation can be applied to initiate the polymerization of the monomers, which is an exothermic reaction. However, it is preferred to apply heat until thermal decomposition of the initiators generates a sufficient number of free radicals to begin the reaction. The temperature at which this occurs varies greatly depending upon the initiator used.

In addition, deoxygenation of the polymerization reaction mixture is often desirable. It is well known that oxygen dissolved in the reaction mixture can inhibit polymerization and it is desirable to expel this dissolved oxygen. Although, an inert gas bubbled into the reaction vessel or through the reaction mixture is an effective means of deoxygenation, other techniques for deoxgenation that are compatible with suspension polymerization can be used. Typically, nitrogen is used to deoxygenate, although any of the Group VIIIA (CAS version) inert gases are also suitable.

While specific time and stirring speed parameters are dependent upon monomers, and initiators, it is desirable to predisperse the reaction mixture until the reaction mixture reaches a state where the average monomer droplet size is between about 1 μm and 300 μm and preferably between 20 μm and 70 μm. The average particle size tends to decrease with increased and prolonged agitation of the reaction mixture.

Preferably, stirring and nitrogen purge are maintained throughout the reaction period. Initiation is begun by heating the reaction mixture. Following polymerization, the reaction mixture is cooled.

In a one-step process both the alkyl (meth)acrylate monomer and any optional comonomer are present together in the suspension at the initiation of polymerization. In a two-step process any optional comonomer is typically added after the initial exotherm resulting from polymerization of the alkyl (meth)acrylate monomer has peaked, but could be added at any point after polymerization has started. The other components, such as the initiator, stabilizers (if used), surfactants and modifiers are present in the reaction mixture as described in the processing steps herein above.

Following polymerization, a stable aqueous suspension of microspheres at room temperature is obtained. The suspension may have non-volatile solids contents of from about 10 to about 70 percent by weight. Upon prolonged standing, the suspension typically separates into two phases, one phase being an aqueous, essentially polymer microsphere-free phase and the other phase being an aqueous suspension of the polymeric microspheres, that is, the microsphere-rich phase. The aqueous suspension of microspheres may be utilized immediately following polymerization, because the suspension of microspheres of the present invention is particularly stable to agglomeration or coagulation. Advantageously, the microspheres of the present invention can be easily coated from an aqueous solution. Surprisingly, the microspheres of the present invention are well suited for conventional coating techniques and have enhanced fluid processing characteristics.

The microsphere-rich phase can be diluted with an additional amount of water or solvent, or redispersed upon shaking or other means of agitation. Generally, this aqueous suspension can be coated onto a backing or other substrate being employed using conventional coating methods, such as slot die coating, to provide an adhesive coating. The microspheres can be compounded with various rheology modifiers and/or latex adhesives or "binders". Typically, the adhesive coating which, when dried, exhibits a dry coating weight in the range of 0.2 to about 2 grams per square foot to provide an adhesive-coated sheet material in which the adhesive coating comprises polymeric microspheres, polymeric stabilizer, surfactant, and optionally rheology modifiers, and/or latex adhesives. Alternatively, the microspheres may be isolated and combined with an organic solvent if desired prior to coating them onto the backing.

Properties of the pressure-sensitive adhesives of the present invention can be altered by the addition of a tackifying resin(s) and/or plasticizer(s) after the polymerization. Preferred tackifiers and/or plasticizers for use herein include hydrogenated rosin esters commercially available from such companies as Hercules, Inc. under the trade names of Foral™, Regalrez® and Pentalyn™. Tackifying resins also include those based on t-butyl styrene. Useful plasticizers include but are not limited to dioctyl phthalate, 2-ethylhexyl phosphate, tricresyl phosphate and the like. If such tackifiers and/or plasticizers are used, the amounts used in the adhesive mixture are amounts effective for the known uses of such additives.

Optionally, adjuvants, such as, rheology modifiers, colorants, fillers, stabilizers, pressure-sensitive latex binders and various other polymeric additives can be utilized. If such adjuvants are used, the amounts used in the adhesive mixture are amounts effective for the known uses of such adjuvants.

Suitable backing or substrate materials for use in the present invention include, but are not limited to, paper, plastic films, cellulose acetate, ethyl cellulose, woven or nonwoven fabric comprised of synthetic or natural materials, metal, metallized polymeric film, ceramic sheet material and the like. Generally the backing or substrate material is about 50 μm to about 155 μm in thickness, although thicker and thinner backing or substrate materials are not precluded.

Particularly useful articles prepared using the microsphere adhesives of the present invention include repositionable adhesive products such as repositionable note and paper products, repositionable tape and tape flags, easel sheets, repositionable glue stick and the like, but may also include other non-repositionable industrial commercial, and medical adhesive products.

The present invention is further illustrated by the following examples, but the particular materials and amounts thereof recited in these examples, as well as other conditions and details, should not be construed to unduly limit this invention. All materials are commercially available or known to those skilled in the art unless otherwise stated or apparent. The following examples are illustrative in nature and are not intended to limit the invention in any way.

EXAMPLES

Test Methods
Solvent Soluble Polymer Content

To determine the solvent soluble polymer content of the prepared microspheres the following process is used.

Dry approximately 1 gram of the water suspension of microspheres in a vacuum oven without heat. After drying, add 100 ml of n-heptane and shake for 24 hours. After shaking, pour through a filter paper (30 micron pores) to remove the non-soluble content. Dry the filtrate in a 100° F. oven.

The weight of the dried filtrate divided by the dried suspension microspheres is the % solvent soluble polymer content.

Peel Adhesion to Bond Paper

Peel adhesion is the force required to remove a coated sheet from a bond paper substrate at a specific angle and rate of removal. In the examples this force is expressed in grams per one inch width of coated sheet. The procedure followed is:

A strip, one inch wide, of coated sheet is applied to the horizontal surface of 20 pound bond paper. A 4.5 lb. hard rubber roller is used to firmly apply the strip to the bond paper. The free end of the coated sheet is attached to the adhesion tester load cell such that the angle of removal will be 90 degrees. The test plate is then clamped in the jaws of the tensile testing machine which is capable of moving the plate away from the load cell at a constant rate of 12 inches per minute. A load cell reading in grams per inch of coated sheet is recorded. The samples are tested three times. The average value of the three tests is reported.

Peel Adhesion to Fabric

The sample to be tested is prepared by applying a one inch wide coated sheet to fabric found on Steelcase office panels using a 4.5 lb. hard rubber roller. The applied sample is stored for 24 hours at 50% RH and 70° F. conditions before the tensile test is commenced. The tensile test is carried out as described above and the average value of three tests is reported in grams per inch of coated sheet. The aged adhesion to fabric is performed as above after the applied sample is aged on the fabric for 3 days at 80% relative humidity and 70° F. conditions.

Peel Adhesion to Painted Sheetrock

The sample to be tested is prepared by applying a one inch wide coated sheet to a painted sheetrock substrate using a 4.5 lb. hard rubber roller. The painted sheetrock test substrates are prepared by applying a coating of a standard semigloss latex enamel paint to the sheetrock. The applied sample is stored for 24 hours at 50% RH and 70° F. conditions before the tensile test is commenced. The tensile test is carded out as described above and the average value of three tests is reported in grams per inch of coated sheet. The aged adhesion to painted sheetrock is performed as above after the applied sample is aged on the sheet rock for 3 days at 70% relative humidity and 70° F. conditions.

Microsphere Transfer

Microsphere transfer for the purposes of this test is defined as the amount of microspheres that transfer to an applied paper when the coated sample is removed from the paper. It is measured as the percent of the area covered with microspheres. The procedure followed is:

A three-quarter (¾") (1.9 cm) wide strip of microsphere coated sample is adhered to a clean area of a clay coated paper commercially available as Kromcoat, for a few seconds using the mechanical rolling action provided by an TLMI release and adhesion tester and then is removed at a 90° degree angle at a constant rate. The clay coated strip is then surveyed by an image processor through a video camera and the percent microsphere coverage of the viewed area is recorded. Ten fields were surveyed on each test sample and the average of these readings is recorded.

Glossary

AA—acrylic acid
ACM—acrylamide
CRA—crotonic acid
FA—fumaric acid
HEMA—hydroxyethyl methacrylate
IOA—isooctyl acrylate
IPA—isopropyl alcohol
ITA—itaconic acid
NVP—N-vinyl pyrrolidone
PSR—painted sheetrock
F—fabric
RH—relative humidity Example 1

To a two liter, three necked flask equipped with a thermometer mechanical stirrer and nitrogen inlet tube was charged 597.5 gm of deionized water, 35 gm of a 10% solids solution of Stepanol AMV (trade name for a 28% solids solution of ammonium lauryl sulfate commercially available from Stepan Company), 17.5 gm of a 10% solution of Goodrite K702 (trade name for a 25% solids solution of polyacrylic acid, 240,000 weight average molecular weight, commercially available from B.F. Goodrich Company) which had been neutralized to a pH of 7.0 with concentrated ammonium hydroxide. To this solution was added 350 gm of isooctyl acrylate and 1.1 gm of Perkadox 16N (trade name for a 95% active bis (4-tert-butylcyclohexyl) peroxydicarbonate initiator commercially available from AKZO Chemicals Inc.), and 0.14 gm (0.04% by weight of the monomer) of dodecanethiol (a chain transfer agent commercially available from Aldrich Chemical Company). The agitation rate was set at 410 revolutions per minute (RPM), and the reaction mixture was heated to 50° C., and purged with nitrogen. The stirring, and nitrogen purge was maintained throughout the reaction period. The reaction was initially set at 50° C. and exothermed after a few minutes and peaked at 76° C. The batch was maintained at 50° C. for 22 hours, cooled and filtered through a cheese cloth. The particle size was 54 µm.

This adhesive dispersion was creamed and the lower phase removed. The creamed adhesive was made into a 50% solids coating by adding 9% Hycar 2600x222 (trade name for an acrylate terpolymer latex containing an N-alkyl substituted acrylamide available from B.F. Goodrich Company), and 1% acrysol ASE60 (trade name for a 28% solids acid containing acrylic emulsion copolymer rheology modifier available from Rohm and Haas Company). The adhesive coating mixture was neutralized with ammonia and applied to a primed bond paper using coming procedures known to the art. The test results are summarized in the Tables 1 and 2 below.

Example 2–6

The examples were prepared according to the procedure described in Example 1 except that the amount of dodecanethiol was changed and the amount and type of comonomer was changed. The formulations and test results are summarized in Tables 1 and 2 below.

TABLE 1

| Example | Comonomer | % Dodecanethiol | Particle Size (µm) | % Solvent Soluble Portion |
| --- | --- | --- | --- | --- |
| 1 | None | 0.04 | 54 | 57 |
| 2 | 1% Hydroxy Ethyl Methacrylate | 0.04 | 53 | 71 |
| 3 | 1% Acrylic Acid | 0.03 | 43 | 83 |
| 4 | 0.5% Acrylic Acid | 0.03 | 34 | 92 |
| 5 | 1% N Vinyl Pyrrolidone | 0.02 | 42 | 65 |
| 6 | 1% Acrylamide | 0.03 | 35 | 80 |

TABLE 2

| Example | Adhesion To Bond Paper | Adhesion To PSR | Adhesion To F | Aged Adhesion PSR | Aged Adhesion F | Total Transfer |
| --- | --- | --- | --- | --- | --- | --- |
| 1 | 59.9 | 16.7 | 2.9 | 21.3 | 14.2 | 4.3 |
| 2 | 98.6 | 21.7 | 3.5 | 28.4 | 3.6 | 1.2 |
| 3 | 109.7 | 42.4 | 6.0 | 52.3 | 8.0 | 1.0 |
| 4 | 89.9 | 21.5 | 2.3 | 51.4 | 2.7 | 0.4 |
| 5 | 92.1 | 18.9 | 1.6 | 38.2 | 1.9 | 2.8 |
| 6 | 69.9 | 18.7 | 1.4 | 32.2 | 2.0 | 0.6 |

Comparative Examples C1–C3

These examples were prepared according to the procedure described in Example 1 except the dodecanethiol was not added and the reaction temperature was maintained for only 5 hours to prevent excessive crosslinking. Comparative example C-1 was actually made according to the U.S. Pat. No. 4,166,152 process and yielded a microsphere dispersion which had 8% coagulum. The formulations of the comparative examples are summarized below in Table 3 and the test results in Table 4.

Comparative Example—C4

A microsphere dispersion was made according to U.S. Pat. No. 3,691,140 using 2.5% ammonium acrylate and 97.5% isooctyl-acrylate. This process yielded microspheres that were 40 microns in size and 20% solvent soluble portion. The adhesive dispersion was creamed and the lower phase removed. The creamed adhesive was made into a 50% solids coating by adding 20% Hycar 2600X222 (trade name for an acrylate terpolymer latex containing an N-Alkyl substituted acrylamide available from B.F. Goodrich Company), and 1% Acrysol ASE60 (trade name for a 28% solids acid containing acrylic emulsion copolymer thickener available from Rohm and Haas company). This coating was applied to a primed bond paper using coating procedures known to the art. The formulation of this comparative example is summarized in Table 3 below and the test results are summarized in Table 4 below.

TABLE 3

| Example | Comonomer | Particle Size | % Solvent Soluble Portion |
|---|---|---|---|
| C-1 | None | 72 | 10 |
| C-2 | 1% Hydroxy Ethyl Methacrylate | 55 | 18 |
| C-3 | 1% Acrylic Acid | 42 | 14 |
| C-4 | 2.5% NH₄ Acrylate | 40 | 20 |

TABLE 4

| Example | Adhesion To Bond Paper | Adhesion To PSR | Adhesion To F | Aged Adhesion PSR | Aged Adhesion F | Total Transfer |
|---|---|---|---|---|---|---|
| C-1 | 49.8 | 8.1 | 0.1 | 1.6 | 0 | 26.9 |
| C-2 | 61.3 | 14.1 | 0.2 | 8.3 | 0 | 16.1 |
| C-3 | 62.5 | 24.2 | 0.3 | 7.3 | 0 | 4.8 |
| C-4 | 71.5 | 22.7 | 0.5 | 8.7 | 0 | 23.4 |

The results in Tables 1 and 2 show that the samples of this invention with a low concentration of a chain transfer agent result in microspheres which are 30 to 95% solvent soluble and on coating make a repositionable adhesive note with improved adhesion to painted sheet rock and fine fabric which do not decrease but improved on aging. Thus making a better repositionable adhesive.

The results with the comparative examples made without any chain transfer agent result in microspheres that have a 10–20% solvent soluble portion and on coating make a repositionable adhesive note with poor adhesion to painted sheetrock and fine fabric. The adhesion to these surfaces decreased on aging and will usually fall off of vertical surfaces.

Examples 7–8 and Comparative Example C5

One gram of sodium dodecyl benzene sulfonate was dissolved in 360 grams of water. 16.8 grams of poly (ethylene oxide)₁₆ acrylate, 7.2 grams of acrylic acid, a tackifier (ECR-180 from Exxon Chemical) in the percentages summarized in Table 5, and 1.05 grams of Lucidol-75 (75% benzoyl peroxide from Elf Atochem) were dissolved in 216 grams of isooctyl acrylate. The above mixture was emulsified in a Gaulin homogenizer, such that the monomer droplet size was 1 µm or less. This emulsion was then charged to a 1 liter reactor, stirred at 400 rpm and heated to 65° C. for 4 hours. The resulting particle size was approximately 5 µm as viewed with an optical microscope. The % solvent soluble portion of the microspheres are summarized in Table 5.

TABLE 5

| Example | Wt. % Tackifier | % Solvent Soluble Portion |
|---|---|---|
| 7 | 11 | 40 |
| 8 | 5 | 30 |
| C5 | 0 | 10 |

Example 9

To a two liter, three-necked flask equipped with a thermometer, mechanical stirrer and nitrogen inlet tube was charged 158 grams of a 0.7% solids solution of Standapol A (trade for a 28% solids solution of ammonium lauryl sulfate commercially available from Henkel Corporation), 158 grams of 1.6% solution of acrylic acid in deionized water, and enough concentrated ammonium hydroxide to neutralize the solution to pH 7. To this solution was added a solution comprised of 100 grams of isooctyl acrylate, 5 grams of heptane and 0.488 grams of Lucidol 70 (trade name for a 70% active benzoyl peroxide initiator commercially available from Pennwalt Corporation). The agitation rate was set to 400 rpm. The reaction mixture was heated to 65° C., purged with nitrogen and reacted at 65° C. for 8 hours. The reaction was then cooled and filtered through cheesecloth. The particle size was 41 µm and the % solvent soluble portion was 59%.

This example showed that solvent could be used as a modifier to obtain a microsphere having a solvent soluble portion within 30–98%.

Example 10

Example 10 was prepared according to the procedure described in Example 9, except that heptane was replaced with 20% by weight of a monomer of the tackifier resin Regelrez® 6108 (trade name for a tackifier resin commercially available from Hercules, Inc.). The particle size was 55 µm and the %solvent soluble portion was 91%.

This example showed that a tackifier resin could be used as a modifier to obtain a microsphere having a solvent soluble portion within 30–98%.

Example 11

To a two liter, three necked flask equipped with a thermometer mechanical stirrer and nitrogen inlet tube was charged 370.0 gm of deionized water, 6.9 gm of Stepanol AMV and 3.86 gm of Goodrite K702 which was then neutralized to a pH of 7.0 with concentrated ammonium hydroxide. To this solution was added 200.0 gm of isooctyl acrylate, 10.0 gm mineral oil (available from Paddock Laboratories, Minneapolis, Minn.), and 0.976 gm of Lucidol 70.). The agitation rate was set to 400 rpm. The reaction mixture was heated to 65° C., purged with nitrogen and reacted at 65° C. for 8 hours. The reaction was then cooled and filtered through cheesecloth. The particle size was 60 µm and the % solvent soluble portion was 41%.

Example 12

Example 12 was prepared according to the procedure described in Example 11, except that 20.0 gm of mineral oil was used. The particle size was 54 µm and the % solvent soluble portion was 62%.

Examples 11 and 12 showed that a plasticizer could be used as a modifier to obtain a microsphere having a solvent soluble portion within 30–98%.

Various modifications and alterations of this invention will become apparent to those skilled in the art without departing from the scope and principles of this invention, and it should be understood that this invention should not be unduly limited to the illustrative embodiments set forth herein above. All publications and patents are incorporated herein by reference to the same extent as if each individual publication or patent was specifically and individually indicated to be incorporated by reference.

We claim:

1. An adhesive composition comprising:
   (a) a plurality of polymeric, elastomeric microspheres wherein the microspheres are the reaction product of polymerizable starting materials comprising at least one $C_4$–$C_{14}$ alkyl (meth)acrylate monomer and optionally at least one comonomer;
   (b) an initiator for the polymerizable monomer starting materials present in amounts ranging from 0.1 to approximately 2 parts per weight per 100 parts by weight of the polymerizable monomer starting materials;
   (c) optionally, a polymeric stabilizer in an amount of between about 0.1 and about 3 parts by weight per 100 parts by weight of the microspheres;
   (d) a surfactant in an amount of no greater than about 5 parts by weight per 100 parts by weight of the microspheres; and
   (e) a chain transfer agent in an amount sufficient to produce 30–98% of a heptane soluble portion in the microspheres.

2. The adhesive according to claim 1 wherein the polymeric stabilizer is present in an amount of about 0.1 to about 1.5 parts by weight per 100 parts by weight of the microspheres.

3. The adhesive according to claim 1 wherein the surfactant is present in an amount of about no greater that 3 parts by weight per 100 parts by weight of the microspheres.

4. The adhesive according to claim 1 wherein the chain transfer agent is selected from the group consisting of carbon tetrabromide, carbon tetrachloride, dodecanethiol, iso-octylthioglycolate, butyl mercaptan, and tertiary-dodecyl mercaptan and is present in an amount of up to about 0.15%.

5. The adhesive according to claim 1 wherein the chain transfer agent is a solvent and is present in an amount ranging from 1 to 30%.

6. The adhesive according to claim 1 wherein the chain transfer agent is a tackifier or plasticizer and is present in an amount ranging from 1 to 30%.

7. A one step polymerization process for the microsphere adhesive according to claim 1 comprising the steps of:
   (a) stirring or agitating a mixture comprising polymerizable monomer starting materials comprising:
      (i) at least one $C_4$–$C_{14}$ alkyl (meth)acrylate monomer and optionally at least one comonomer;
      (ii) an initiator for the polymerizable monomer starting materials present in amounts ranging from 0.1 to approximately 2 parts per weight per 100 parts by weight of the polymerizable monomer starting materials
      (iii) optionally, a polymeric stabilizer in an amount in the range of 0.1 to about 3 parts by weight per 100 parts by weight of the polymerizable monomer starting materials;
      (iv) a surfactant in an amount of no greater than about 5 parts by weight per 100 parts by weights of polymerizable monomer; and
      (v) a chain transfer agent in an amount sufficient to provide 30–98% of a heptane soluble portion of the microspheres;
   (b) polymerizing the (meth)acrylate monomer(s) and the comonomer(s).

8. The one-step polymerization process according to claim 7 wherein the chain transfer agent is selected from the group consisting of carbon tetrabromide, carbon tetrachloride, dodecanethiol, iso-octylthioglycolate, butyl mercaptan, and tertiary-dodecyl mercaptan and is present in an amount of up to about 0.15%.

9. The adhesive according to claim 7 wherein the chain transfer agent is a solvent and is present in an amount ranging from 1 to 30%.

10. The adhesive according to claim 7 wherein the chain transfer agent is a tackifier or plasticizer and is present in an amount ranging from 1 to 30%.

11. A two-step polymerization process for the microsphere adhesive according to claim 1 comprising the steps of:
   (a) stirring or agitating a mixture comprising polymerizable monomer starting materials comprising:
      (i) at least one $C_4$–$C_{14}$ alkyl (meth)acrylate monomer;
      (ii) an initiator for the monomer; a polymeric stabilizer in an amount of about 0.1 to about 3 parts by weight per 100 parts by weight of the polymerizable monomer starting materials;
      (iii) a surfactant in an amount of no greater than about 5 parts by weight per 100 parts by weight or the polymerizable monomer starting materials;
      (iv) a chain transfer agent in an amount sufficient to provide 30–98% of a heptane soluble portion of the microspheres; and
      (v) water to form an oil in water suspension;
   (b) partially polymerizing the polymerizable monomer starting materials;
   (c) adding to the suspension at least one comonomer; and
   (d) continuing the polymerization of the polymerizable monomer starting materials.

12. The two-step polymerization process according to claim 11 wherein the modifier is a chain transfer agent is selected from the group consisting of carbon tetrabromide, carbon tetrachloride, dodecanethiol, iso-octylthioglycolate, butyl mercaptan, and tertiary-dodecyl mercaptan and is present in an amount of up to about 0.15%.

13. The adhesive according to claim 11 wherein the chain transfer agent is a solvent and is present in an amount ranging from 1 to 30%.

14. The adhesive according to claim 11 wherein the chain transfer agent is a tackifier or plasticizer and is present in an amount ranging from 1 to 30%.

15. An adhesive article comprising a backing and a coating the microsphere adhesive according to claim 1 coated on at least a portion of at least one surface of the backing.

* * * * *

UNITED STATES PATENT AND TRADEMARK OFFICE
CERTIFICATE OF CORRECTION

PATENT NO.: 5,714,237

DATED: Feb. 3, 1998

INVENTOR(S): Terrence E. Cooprider, Michael D. Crandall, James E. Garbe, Richard J. Goetz, Michael R. Kesti It is certified that error appears in the above-identified patent and that said Letters Patent is hereby corrected as shown below:

Col. 2, line 55, replace "Regalfez®" with -- Regalrez® --
Col. 2, line 64, replace "acne" with -- a one --
Col. 4, line 14 should read -- EMBODIMENT(S)
Col. 7, line 57, replace "Alanine" with --Analine --
Col. 10, line 51, replace "carded" with --carried --
Col. 12, line 2, replace "coming" with --coating --

In the claims:

Col. 16, line 21, replace "dodeclyl" with -- dodecyl --
Col. 16, line 39, replace "or" with --of --.

Signed and Sealed this

Eleventh Day of May, 1999

Attest:

Q. TODD DICKINSON

*Attesting Officer*     Acting Commissioner of Patents and Trademarks